(12) United States Patent
Devore et al.

(10) Patent No.: US 10,167,726 B2
(45) Date of Patent: Jan. 1, 2019

(54) COMPONENT CORE WITH SHAPED EDGES

(71) Applicant: United Technologies Corporation, Hartford, CT (US)

(72) Inventors: Matthew A. Devore, Cromwell, CT (US); Matthew S. Gleiner, Norwalk, CT (US); Douglas C. Jenne, Ashford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 501 days.

(21) Appl. No.: 14/821,831

(22) Filed: Aug. 10, 2015

(65) Prior Publication Data
US 2016/0076382 A1 Mar. 17, 2016

Related U.S. Application Data (60) Provisional application No. 62/048,817, filed on Sep. 11, 2014.

(51) Int. Cl.
*F01D 5/18* (2006.01)
*F01D 9/04* (2006.01)
(Continued)

(52) U.S. Cl.
CPC ............. *F01D 5/186* (2013.01); *F01D 5/187* (2013.01); *F01D 9/041* (2013.01); *F01D 11/08* (2013.01);
(Continued)

(58) Field of Classification Search
CPC .......... F01D 5/186; F01D 5/187; F01D 11/08; F01D 9/041; F01D 25/12
See application file for complete search history.

(56) References Cited

U.S. PATENT DOCUMENTS 3,578,264 A * 5/1971 Kuethe ................... B64C 21/10
181/220
3,741,285 A * 6/1973 Kuethe ................... B64C 21/10
165/109.1
(Continued)

FOREIGN PATENT DOCUMENTS

EP 0230917 8/1987
EP 1074695 2/2001
(Continued)

OTHER PUBLICATIONS

European Search Report for European Patent Application No. 15184514 completed Feb. 12, 2016.

*Primary Examiner* — Eldon Brockman
(74) *Attorney, Agent, or Firm* — Carlson, Gaskey & Olds, P.C.

(57) ABSTRACT

A gas turbine engine component according to an exemplary aspect of the present disclosure includes, among other things, at least one cooling passage. The at least one cooling passage includes a first wall and a second wall bounding the at least one cooling passage, the first wall having a plurality of first surface features and the second wall having a plurality of second surface features. The plurality of first surface features and the plurality of second surface features are arranged such that a width of the cooling passage varies along a length of the cooling passage defined by the plurality of first surface features and the plurality of second surface features. The plurality of first surface features has a first profile, and the plurality of second surface features has a second, different profile. A casting core for forming cooling passages in an aircraft component is also disclosed.

18 Claims, 5 Drawing Sheets

(51) Int. Cl.
*F01D 11/08* (2006.01)
*F01D 25/12* (2006.01)
*B22C 9/10* (2006.01)

(52) U.S. Cl.
CPC .............. *F01D 25/12* (2013.01); *B22C 9/10* (2013.01); *B22C 9/106* (2013.01); *F05D 2220/32* (2013.01); *F05D 2230/211* (2013.01); *F05D 2240/12* (2013.01); *F05D 2240/126* (2013.01); *F05D 2240/30* (2013.01); *F05D 2240/55* (2013.01); *F05D 2240/81* (2013.01); *F05D 2260/202* (2013.01); *Y02T 50/676* (2013.01)

(56) References Cited

U.S. PATENT DOCUMENTS

| | | | | |
|---|---|---|---|---|
| 4,012,167 | A * | 3/1977 | Noble | F01D 5/187 |
| | | | | 415/115 |
| 4,017,213 | A * | 4/1977 | Przirembel | F01D 5/187 |
| | | | | 415/115 |
| 5,344,283 | A | 9/1994 | Magowan et al. | |
| 5,704,763 | A | 1/1998 | Lee | |
| 5,738,493 | A * | 4/1998 | Lee | F01D 5/187 |
| | | | | 415/115 |
| 6,017,189 | A | 1/2000 | Judet et al. | |
| 6,179,565 | B1 * | 1/2001 | Palumbo | F01D 5/187 |
| | | | | 415/115 |
| 6,190,130 | B1 | 2/2001 | Fukue et al. | |
| 6,254,333 | B1 * | 7/2001 | Merry | F01D 5/187 |
| | | | | 29/889.2 |
| 6,672,836 | B2 * | 1/2004 | Merry | F01D 5/187 |
| | | | | 415/178 |
| 6,896,487 | B2 * | 5/2005 | Cunha | F01D 5/186 |
| | | | | 415/115 |
| 6,974,308 | B2 * | 12/2005 | Halfmann | B22C 9/04 |
| | | | | 415/115 |
| 7,255,536 | B2 | 8/2007 | Cunha et al. | |
| 7,309,212 | B2 | 12/2007 | Itzel et al. | |
| 7,695,247 | B1 | 4/2010 | Liang | |
| 7,938,624 | B2 * | 5/2011 | Tibbott | F01D 5/187 |
| | | | | 415/115 |
| 8,353,669 | B2 * | 1/2013 | Chon | F01D 5/187 |
| | | | | 416/193 A |
| 8,356,978 | B2 * | 1/2013 | Beattie | F01D 5/18 |
| | | | | 415/115 |
| 8,523,527 | B2 | 9/2013 | Lacy et al. | |
| 8,734,111 | B2 | 5/2014 | Lomas et al. | |
| 8,777,568 | B2 | 7/2014 | Ellis et al. | |
| 2003/0108422 | A1 * | 6/2003 | Merry | F01D 5/187 |
| | | | | 416/97 R |
| 2004/0076519 | A1 * | 4/2004 | Halfmann | B22C 9/04 |
| | | | | 416/97 R |
| 2005/0031450 | A1 * | 2/2005 | Cunha | F01D 5/186 |
| | | | | 416/97 R |
| 2008/0063524 | A1 * | 3/2008 | Tibbott | F01D 5/187 |
| | | | | 416/95 |
| 2011/0044795 | A1 * | 2/2011 | Chon | F01D 5/187 |
| | | | | 415/115 |
| 2011/0123310 | A1 * | 5/2011 | Beattie | F01D 5/18 |
| | | | | 415/115 |
| 2013/0108416 | A1 | 5/2013 | Piggush et al. | |
| 2013/0243575 | A1 * | 9/2013 | Zelesky | F01D 5/187 |
| | | | | 415/116 |
| 2015/0152735 | A1 * | 6/2015 | Molter | F01D 5/187 |
| | | | | 416/97 R |
| 2016/0312623 | A1 * | 10/2016 | Zelesky | F01D 5/187 |

FOREIGN PATENT DOCUMENTS

| | | |
|---|---|---|
| WO | 03042503 | 5/2003 |
| WO | 2013188869 | 12/2013 |

* cited by examiner

COMPONENT CORE WITH SHAPED EDGES

CROSS-REFERENCE TO RELATED APPLICATION

The present disclosure claims priority to U.S. Provisional Patent Application No. 62/048,817, filed Sep. 11, 2014.

STATEMENT REGARDING FEDERALLY SPONSORED RESEARCH OR DEVELOPMENT

This invention was made with government support under Contract No. F33615-03-D-2354-0009 awarded by the United States Air Force. The Government may therefore have certain rights in this invention.

BACKGROUND

This application relates to a cooling passage for a component in a turbine section of gas turbine engine.

Gas turbine engines include a compressor which compresses air and delivers it downstream into a combustion section. The air is mixed with fuel in the combustion section and ignited. Products of this combustion pass downstream over turbine rotors, which are driven to rotate. In addition, static vanes are positioned adjacent to the turbine rotors to control the flow of the products of combustion.

The turbine rotors carry blades. The blades and the static vanes have airfoils extending from platforms. The blades and vanes are subject to extreme heat, and thus cooling schemes are utilized for each.

Some vanes and blades have cooling passages to providing cooling to various portions of the vanes and blades.

SUMMARY

A gas turbine engine component according to an example of the present disclosure includes an airfoil section extending from a platform and a cooling passage located in at least one of the airfoil section and the platform. The cooling passage includes a first wall and a second wall bounding the cooling passage. The first wall has a plurality of first surface features and the second wall has a plurality of second surface features. The plurality of first surface features and the plurality of second surface features are arranged such that a width of the cooling passage varies along a length of the cooling passage. The plurality of first surface features has a first profile, and the plurality of second surface features has a second, different profile.

In a further embodiment if any of the foregoing embodiments, at least one of the plurality of first surface features and the plurality of second surface features includes a waveform surface, and the waveform surface is curved.

In a further embodiment if any of the foregoing embodiments, at least one of the plurality of first surface features and the plurality of second surface features includes a grooved surface.

In a further embodiment if any of the foregoing embodiments, the first wall includes a plurality of third surface features, the plurality of third surface features having a different profile than the plurality of first surface features and the second surface features.

In a further embodiment if any of the foregoing embodiments, the plurality of first surface features and the plurality of second surface features are arranged to define at least two converging regions along the cooling passage.

In a further embodiment if any of the foregoing embodiments, each of the plurality of first surface features and the plurality of second surface features includes a surface contour.

In a further embodiment if any of the foregoing embodiments, the plurality of first surface features and the plurality of second surface features are aligned along a first region of the cooling passage and are staggered along a second region of the cooling passage.

In a further embodiment if any of the foregoing embodiments, the plurality of first surface features has a first distribution along the length and the plurality of second surface features has a second, different distribution along the length.

A further embodiment of any of the foregoing embodiments includes a plurality of internal features formed within the cooling passage.

In a further embodiment if any of the foregoing embodiments, a convergent portion of at least one of the plurality of first surface features is aligned with at least one of the plurality of internal features.

In a further embodiment if any of the foregoing embodiments, the plurality of internal features includes pedestals.

In a further embodiment if any of the foregoing embodiments, the platform has a pressure side and a suction side relative to the airfoil portion, and the plurality of first surface features and the plurality of second surface features extend along the pressure side.

In a further embodiment if any of the foregoing embodiments, the airfoil section has a leading edge and a trailing edge. The cooling passage includes an intermediate portion spaced between an inlet portion and an outlet portion. The inlet portion extends axially between the inlet and the leading edge. The outlet portion extends axially between the outlet and the trailing edge, and the plurality of first surface features and the plurality of second surface features are located in the intermediate portion.

In a further embodiment if any of the foregoing embodiments, at least one of the plurality of first surface features and the plurality of second surfaces feature is located in at least one of the inlet portion and the outlet portion.

In a further embodiment if any of the foregoing embodiments, the plurality of first surface features and the plurality of second surface features are located within the platform.

In a further embodiment if any of the foregoing embodiments, the plurality of first surface features and the plurality of second surface features are located in the airfoil section.

A casting core for forming cooling passages in an aircraft component according to an example of the present disclosure include a first portion defining an inlet to receive coolant, a second portion defining an outlet to eject coolant, and an intermediate portion extending between the inlet and the outlet. The intermediate portion defines a cooling passage formed in a component. The intermediate portion defines a first wall and a second wall. The first wall has a plurality of first surface features, and the second wall has a plurality of second surface features. The plurality of first surface features and the plurality of second surface features are arranged to define a width of the intermediate portion that varies along a length defined between the first portion and the second portion. The plurality of first surface features has a first profile, and the plurality of second surface features has a second, different profile.

In a further embodiment if any of the foregoing embodiments, at least one of the plurality of first surface features and the plurality of second surface features includes a waveform surface. The waveform surface is curved, and the other of the at least one of the plurality of first surface features and the plurality of second surface features includes a grooved surface.

A gas turbine engine according to an example of the present disclosure includes a plurality of blade outer air seals each arranged circumferentially about an axis to define a flow path and a plurality of airfoils spaced from the plurality of blade outer air seals. Each of the plurality of airfoils includes an airfoil section extending from a platform. At least one of the plurality of blade outer air seals and the plurality of airfoils includes at least one cooling passage. The at least one cooling passage includes a first wall and a second wall bounding the at least one cooling passage. The first wall has a plurality of first surface features and the second wall has a plurality of second surface features. The plurality of first surface features and the plurality of second surface features are arranged such that a width of the cooling passage varies along a length of the cooling passage defined by the plurality of first surface features and the plurality of second surface features. The plurality of first surface features has a first profile, and the plurality of second surface features has a second, different profile.

In a further embodiment if any of the foregoing embodiments, the at least one of the plurality of blade outer air seals and the plurality of airfoils is located in a turbine section.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION OF THE PREFERRED EMBODIMENT

Figure 1:
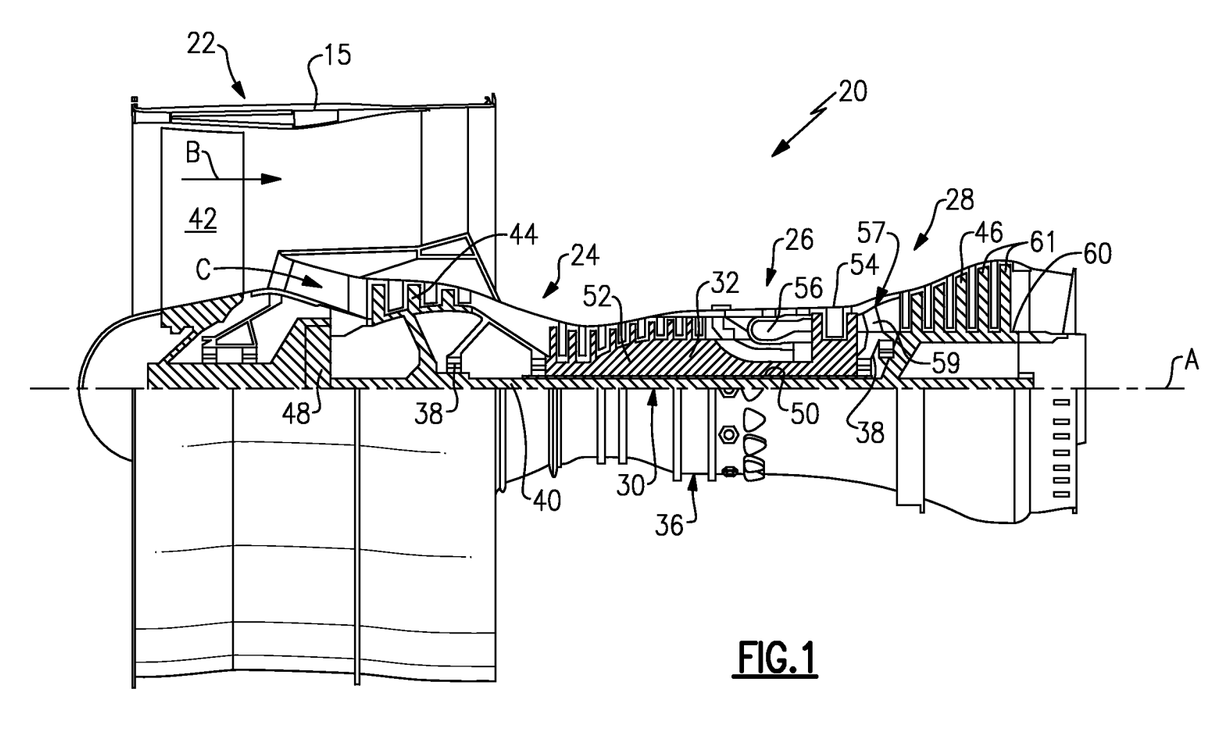
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R]^{0.5}$. The "Low corrected fan tip speed" as disclosed herein according to one non-limiting embodiment is less than about 1150 ft/second.

Figure 2:
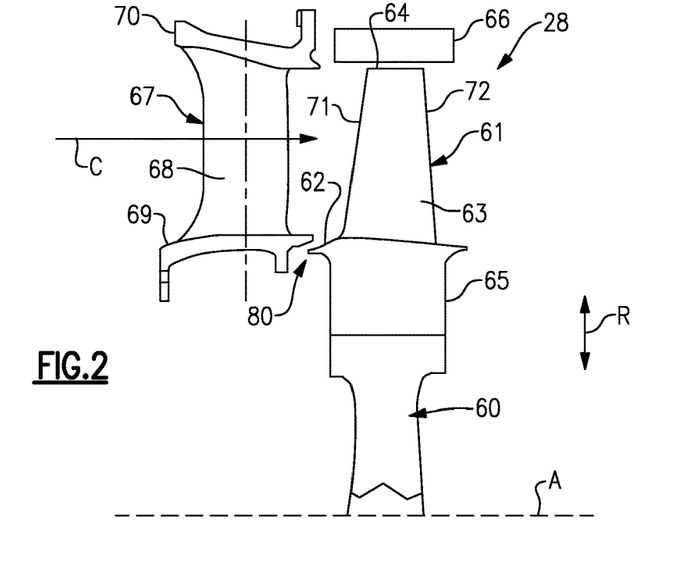
FIG. 2 shows a turbine rotor.

FIG. 2 shows a highly schematic view of a portion of the turbine section 28 including a rotor 60 carrying one or more blades 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. Each blade 61 includes a platform 62 and an airfoil section 63 extending in a radial direction R from the platform 62 to a tip 64. A root section 65 of the blade 61 is mounted to the rotor 60, for example. It should be understood that the blade 61 may be integrally formed with the rotor 60, known as an integrally bladed rotor (IBR), such that the root section 65 is eliminated. A blade outer air seal 66 is spaced radially outward from the tip 64 of the airfoil section 63. A vane 67 is positioned along the axis A and adjacent to the blade 61. The vane 67 includes an airfoil 68 extending between an inner platform 69 and an outer platform 70 to define the core flow path C. The vane 67 is arranged to direct the combustion products in the core flow path C downstream to the airfoil section 63. The turbine section 28 includes multiple blades 61, vanes 67, and blade outer air seals 66 arranged circumferentially about the central axis A.

Figure 3:
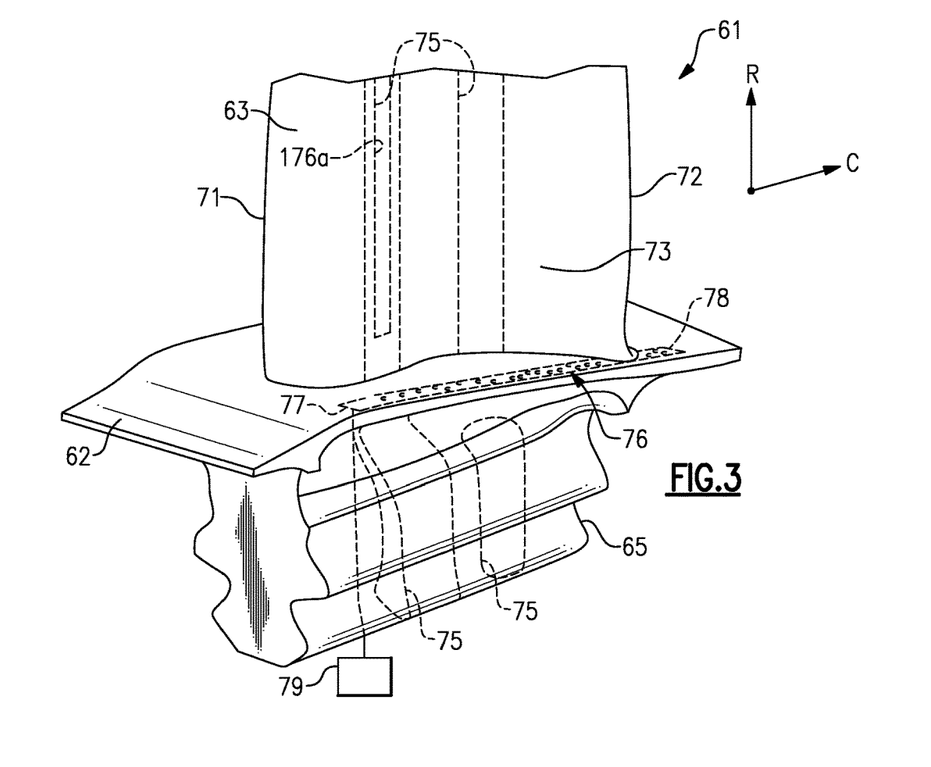
FIG. 3 is a partial perspective view of a turbine blade.
Figure 4:
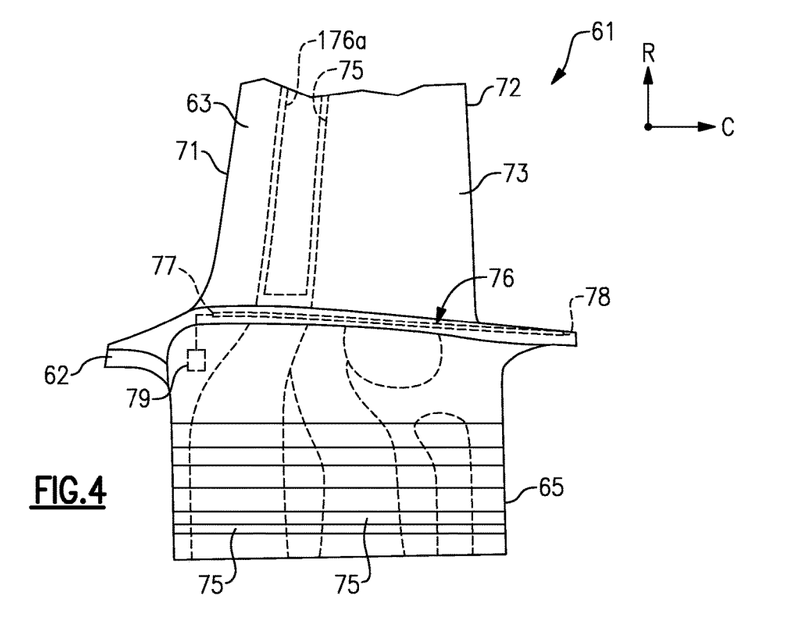
FIG. 4 is a side view through the platform of the FIG. 3 blade.
Figure 5:
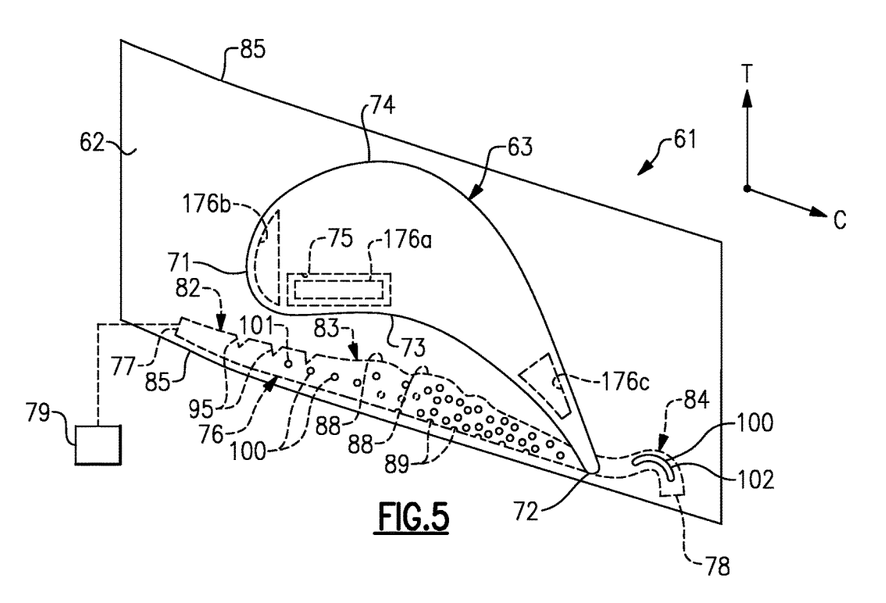
FIG. 5 is a top view of selected portions of the turbine blade of FIG. 3.

Referring to FIGS. 3 to 5, the airfoil section 63 generally extends in a chordwise direction C from a leading edge 71 to a trailing edge 72. The airfoil section 63 is provided between a pressure side 73 and a suction side 74 in a thickness direction T, which is generally perpendicular to the chordwise direction C. A plurality of cooling fluid supply passages 75 are provided between the pressure and suction sides 73, 74. The supply passages 75 may extend through the root section 65 to communicate coolant to various portions of the blade 61. An exterior surface of the blade 61 may include multiple film cooling holes (not shown) in fluid communication with the supply passages 75 to provide film cooling to various surfaces of the blade 61.

At least one component of the turbine section 28 is provided with one or more cooling passages 76 to provide cooling to various portions of the component. The component can be the blade 61, the vane 67 or the blade outer air seal 66, for example, although other components of the turbine section 28 and the engine 20 may benefit from the teachings disclosed herein, including components of the compressor section 24. As shown, the component is blade 61, with a cooling passage 76 positioned on the pressure side 73 of the airfoil section 63, and in the platform 62, for example. The cooling passage 76 passes through the platform 62, beneath the trailing edge 72, and then to an outlet 78. It should be appreciated that the location of the cooling passages 76 are not limited to the particular arrangement shown in FIGS. 3 through 5, and may be located in different orientations relative to the platform 62 or the airfoil section 63. The cooling passages 76 may also be located in other portions of the blade 61, including the root section 65 and/or the airfoil section 63.

Each cooling passage 76 has an inlet 77 for supplying coolant and the outlet 78 for discharging the relatively warmer coolant once the coolant accepts heat rejected from portions of the blade 61. The inlet 77 is fluidly coupled to a coolant source 79 (shown schematically). In some examples, at least one of the supply passages 75 is the coolant source 79. In other examples, the coolant source 79 is bleed air from an upstream stage of the compressor section 24 or bypass air. In further examples, the coolant source 79 is provided by coolant communicated through a clearance gap 80 (shown in FIG. 2). However, other coolant sources are contemplated, such as a secondary cooling system aboard the aircraft. The outlet 78 may be positioned to discharge coolant to the core flow path C (shown in FIG. 2) to provide film cooling to external surfaces of the platform 62. The inlet 77 and outlet 78 can be located at any number of locations depending on the particular design, and the environment in which the component is to be utilized.

Other portions of the blade 61 can also include one or more cooling passages. In some embodiments, the airfoil section 63 includes at least one cooling passage 176 (shown schematically in dashed lines), having any of the features described herein. As shown in FIG. 5, which illustrates selected portions of the blade 61, the cooling passage 176 can form a portion of one of the supply passages 75, shown as cooling passage 176a, or can form a separate flow path and can be located adjacent the leading edge 71 of the airfoil section 63, as depicted by cooling passage 176b. The cooling passages 176 can be positioned adjacent to the trailing edge 72, as depicted by cooling passage 176c, although other arrangements are contemplated. The cooling passage 176 extends generally in the radial direction R from the platform 62, as shown in FIGS. 3 and 4. In other examples, the cooling passage 176 can extend generally in the chordwise direction C and/or the radial direction R, or also in the thickness direction T, including any of the features described herein.

Figures 6, 7:
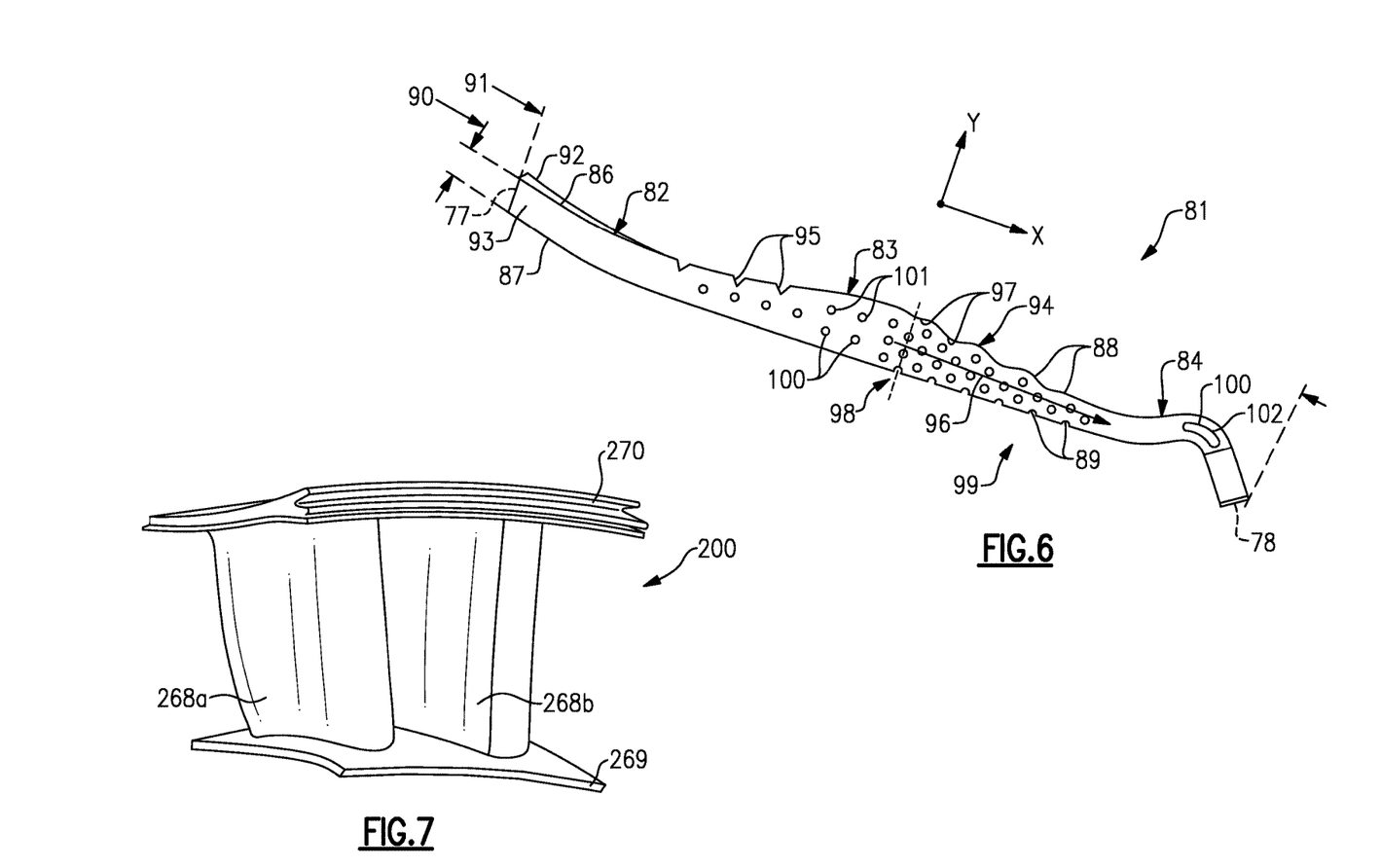
FIG. 6 is a top view of the core of FIG. 3.
FIG. 7 shows a static vane.

FIG. 6 illustrates an embodiment of a core 81 which can be utilized to form any of the cooling passages described herein, including cooling passages 76, 176. FIG. 5 illustrates the formation of one of the cooling passages 76, 176 utilizing the core 81. The core 81 includes an inlet portion 82 to be fluidly coupled to the inlet 77 and an outlet portion 84 to be fluidly coupled to the outlet 78. An intermediate portion 83 is spaced between the inlet portion 82 and the outlet portion 84. The core 81 may be a single, unitary core or include multiple core portions secured to one another.

In one example, the inlet portion 82 is configured to extend axially upstream of the leading edge 71 of the airfoil section 63 to the inlet 77, and the outlet portion 84 is configured to extend axially downstream of the trailing edge 72 to the outlet 78, as shown in FIG. 5. The outlet portion 84 of the core 81 is arranged to direct the exiting cooling flow to line up with the core flow C through the engine 20. Other geometries of the outlet portion 84 are contemplated, such as a straight passage to the outlet 78. The intermediate portion 83 can be arranged to extend axially along an edge wall 85 of the platform 62 and between the leading edge 71 and the trailing edge 72 of the airfoil section 63, as shown in FIG. 5. Of course, the location of the inlet 77 and outlet 78, as well as each of the inlet, outlet and intermediate portions 82, 83, 84, can be from any number of locations depending on the particular design, and the environment in which the component is to be utilized.

The core 81 includes a first wall 86 and a second wall 87 configured to bound the cooling passage 76. The first wall 86 has one or more first surface features 88 and the second wall 87 has one or more second surface features 89. The surface features 88, 89 are arranged such that a width 90 of the core 81 extending generally along y-axis Y forming the cooling passage varies along a length 91 of the core 81 extending generally along x-axis X. In some examples, the first and second surface features 88, 89 are arranged to meter flow of coolant through the cooling passage 76, as illustrated by the cooling passage 76 of FIG. 5, although metering of the flow is not limited to this arrangement. It should be appreciated that other surfaces of the core 81 can include surface features 88, 89. In some examples, at least one of a floor 92 and a ceiling 93 spaced by the first and second walls 86, 87 include any of the surface features 88, 89. In further examples, each of the first and second walls 86, 87, the floor 92 and the ceiling include surface features 88, 89. Although shown in a generally elongated rectangular form, other shapes of the core 81 are contemplated. It should also be appreciated that the core 81 can be arranged in any orientation and/or location with respect to the formation of the components of this disclosure.

The surface features 88, 89 can include various geometries and contouring to increase surface area and affect the distribution of coolant through the cooling passage 76. As shown, the plurality of first surface features 88 have a first profile, and the plurality of second surface features 89 have a second, different profile. In other examples, the surface features 88, 89 include similar or the same profiles. Each of the first and surface features 88, 89 can be uniformly spaced or arranged at spaced at different intervals along the core 81.

For example, each of the first surface features 88 is shown is a surface contour and are arranged to form a waveform surface 94. In this disclosure, the term surface contour should be understood as defining a curved segment. Each surface contour can be concave or convex with respect to the first and second walls 86, 87 of the core 81, for example. In some examples, the surface features 88 are arranged to define a sinusoidal geometry changing in frequency and amplitude along the length 91 of the casting core 81 as shown in FIG. 6. In other examples, the geometry of each of the first surface features 88 is substantially similar or identical. The arrangement of the first surface features 88 increases the cooling surface area along the cooling passage 76, and further allows better heat transfer characteristics. In other examples, each of first and second surface features 88, 89 includes a surface contour.

In some examples, either of the walls 86, 87, such as the first wall 86, can include one or more third surface features 95 having a different profile than the first surface features 88. This permits the cooling passage 76 formed along the first wall 86 to have different flow and heat transfer characteristics along the length 91 of the cooling passage 76 formed by the core 81. As shown, the third surface features 95 have a triangular geometry. However, other geometries are contemplated, including a combination of any of the geometries described herein. In some examples, at least one of the first and second surface features 88, 89 has a triangular geometry.

Each of the second surface features 89 is shown as a grooved surface distributed along the second wall 87. In this disclosure, the term "grooved surface" should be understood as defining a surface having one or more depressions arranged at spaced intervals (or protrusions extending into the cooling passage 76 formed by the core 81), each having a projection intersecting a tangent line defined by an adjacent surface, rather than being tangential to the adjacent surface. The depressions can have various geometries, including an elongated or semicircular profile as shown in FIG. 6. However, other geometries are contemplated including those with one or more substantially straight segments, or a combination of straight and curved segments configured to extend into the cooling passage 76. In some examples, the second surface features 89 are uniformly spaced along at the second wall 87, and in other examples, the second surface features 89 are spaced at different intervals. The grooved surface generally provides the cooling passage 76 with different flow and heat transfer characteristics than the waveform surface of the first surface features 88. The second surface features 89 depicted as grooved surfaces are shown at regularly spaced intervals along the second wall 87 and having the same profile, although other intervals and profiles are contemplated. In some examples, the first wall 86 may have grooved surfaces.

The first and second surface features 88, 89 can be arranged to define a convergent-divergent flow path 96 to provide one or more converging regions along the core 81 providing the cooling passage 76, 176. As shown, the first and second surface features 88, 89 are arranged to provide at least two converging regions 97 along the core 81. In some examples, the first and second surface features 88, 89 are substantially aligned along the x-axis X in a first region 98 of the convergent-divergent flow path 96 and are staggered along the x-axis X along a second region 99 of the core 81. In other examples, each of the first and second surface features 88, 89 are aligned along the core 81. In yet other examples, each of the first and second surface features 88, 89 are staggered along the core 81.

Various internal features 100 can be formed in the cooling passage 76 by the core 81 to meter flow through the cooling passage 76 and increase heat transfer between the coolant and surrounding portions of the component. The geometry of the internal features 100 can also be selected to provide a desired rigidity of the component. As shown, the internal features 100 can include pedestals 101 extending between surfaces of the cooling passage 76. In other examples, the internal features can be at least one rib 102. Other internal features are contemplated, including pin fins, trip strips, and guide vanes. In some examples, a convergent portion of at least one of the first surface features 88 and/or the second surface features 89 is aligned with at least one of the internal features 100, as illustrated by the first region 98 of the core 81. This arrangement further restricts the flow of coolant through the cooling passage 76. In other examples, the internal features 100 include outlet ports upstream of the outlet 78 to selectively communicate coolant to various surfaces of the component. It should be appreciated that different combinations, locations and geometries of the internal features 100 are contemplated.

FIG. 7 illustrates an embodiment 200, wherein the cooling passage is incorporated into a static vane arrangement. Vane airfoils 268a and 268b extend between inner and outer platforms 269, 270. While a dual vane arrangement is shown, a single vane may also incorporate the cooling passage, as may any number of other static vane arrangements.

Figure 8:
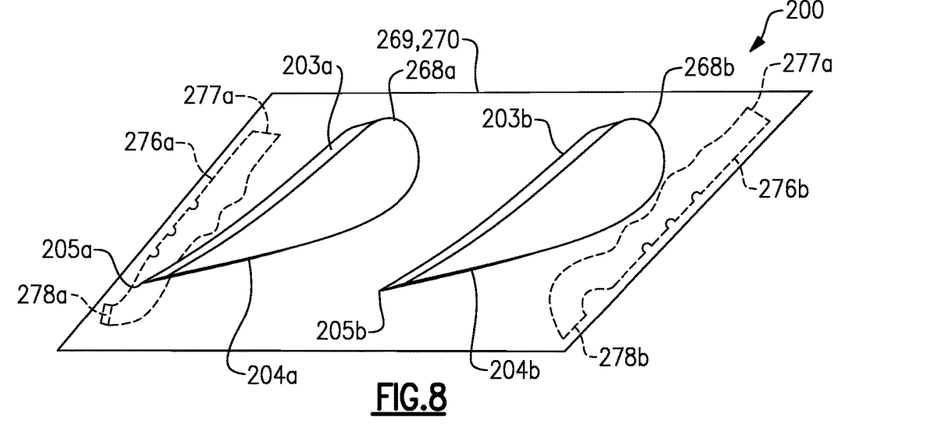
FIG. 8 is a bottom view of selected portions of the FIG. 7 vane.

As shown in FIG. 8, a first cooling passage 276a is formed on a pressure side 203a of the airfoil 268a, and extends axially toward a suction side 204a of the airfoil 268a with respect to a projection of a trailing edge 205a. A second cooling passage 276b is formed on a suction side 204b of the vane airfoil 268b. It is contemplated that the cooling passages 276 can be arranged in any location of the vane airfoils 268 and platforms 269, 270, including between vane airfoils 268, and are not be limited to the orientations provided for illustrative purposes of this disclosure. It should also be appreciated that the cooling passages 276a, 276b can be formed in the platforms 269, 270 and/or in the airfoils 268a, 268b using any of the arrangements and techniques of this description, including any arrangement of the cooling passages 76, 176 illustrated or discussed.

Figure 9:
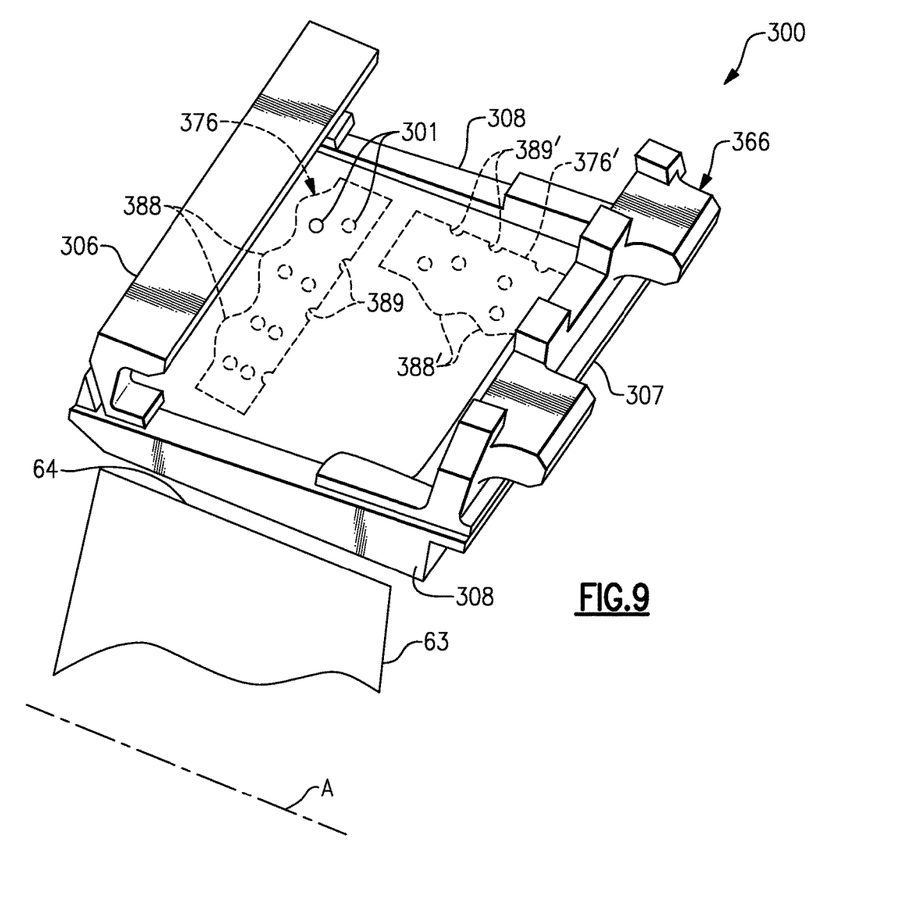
FIG. 9 shows a perspective view of a blade outer air seal.

FIG. 9 illustrates an embodiment 300, in which the cooling passage is incorporated into a blade outer air seal. The blade outer air seal 366 includes a leading edge 306, a trailing edge 307 and side walls 308. A cooling passage 376 is formed in the blade outer air seal 366 and is shown extending between the side walls 308. The cooling passage 376 includes first and second cooling features 388, 389, and can also include internal features, such as pedestals 301, in any manner described herein. The cooling passage 376 can be arranged in other positions relative to the leading and trailing edges 306, 307 and the side walls 308. For example, the cooling passage may extend along engine axis A between the leading and trailing edges 306, 307, as depicted by cooling passage 376'. The cooling passage 376 can also have different geometries and any of the features disclosed herein to provide cooling to the various portions of the blade outer air seal 366. The blade outer air seal 366 can also include multiple cooling passages 376 arranged in similar or different relative orientations. It should also be appreciated that the cooling passages 76, 176, 276 formed in the platforms 62, 269, 270 can be arranged in a similar orientation as the cooling passages 376.

The cooling passages 76, 176, 276, 376 may be formed from any suitable manufacturing process known in the art such as additive manufacturing, electric discharge machining (EDM), or laser or waterjet machining, for example. The cooling passage 76, 176, 276, 376 may be formed from a refractory metal or metal alloy such as molybdenum or a molybdenum alloy, for example. In some examples, the cooling passage 76, 176, 276, 376 may be formed from a ceramic or silica material. The cooling passage 76, 176, 276, 376 can be formed by an additive manufacturing process utilizing a lost core molding technique, as is known in the art. In other examples, the cooling passage 76, 176, 276, 376 can be created by welding a plate (not shown) onto the part after the cooling passage 76, 176, 276, 376 has been created by a molding technique. Any number of other ways of forming the cooling passage 76, 176, 276, 376 can also be utilized.

Although the cooling passages of this disclosure are primarily discussed in the context of blades, vanes and blade outer air seals, it should be appreciated that other components of the engine 20 that can be internally cooled using casting cores. Other components formed with casting cores can also benefit from the teachings herein. Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine component, comprising:
   an airfoil section extending from a platform;
   a cooling passage located in at least one of said airfoil section and said platform, said cooling passage including a first wall and an opposed second wall bounding said cooling passage, said first wall having a plurality of first surface features and said second wall having a plurality of second surface features;
   wherein said plurality of first surface features and said plurality of second surface features are arranged such that a width of said cooling passage varies along a length of said cooling passage, said plurality of first surface features having a first profile, and said plurality of second surface features having a second, different profile;
   wherein said plurality of first surface features are spaced apart from said plurality of second surface features;
   wherein said plurality of second surface features includes three surface features each having an elongated profile that protrudes from said second wall into said cooling passage; and
   wherein said plurality of first surface features includes a waveform surface, said waveform surface is curved, and said plurality of first surface features are arranged to define a sinusoidal geometry changing in frequency and amplitude along the length of the cooling passage.

2. The gas turbine engine component as recited in claim 1, wherein at least one of said plurality of first surface features and said plurality of second surface features includes a grooved surface.

3. The gas turbine engine component as recited in claim 1, wherein said first wall includes a plurality of third surface features, said plurality of third surface features having a different profile than said plurality of first surface features and said second surface features.

4. The gas turbine engine component as recited in claim 1, wherein said plurality of first surface features and said plurality of second surface features are arranged to define at least two converging regions along said cooling passage.

5. The gas turbine engine component as recited in claim 4, wherein each of said plurality of first surface features and said plurality of second surface features includes a surface contour.

6. The gas turbine engine component as recited in claim 4, wherein said plurality of first surface features and said plurality of second surface features are aligned along a first region of said cooling passage and are staggered along a second region of said cooling passage.

7. The gas turbine engine component as recited in claim 4, wherein said plurality of first surface features has a first distribution along said length and said plurality of second surface features has a second, different distribution along said length.

8. The gas turbine engine component as recited in claim 4, comprising a plurality of internal features formed within said cooling passage.

9. The gas turbine engine component as recited in claim 8, wherein a convergent portion of at least one of said plurality of first surface features is aligned with at least one of said plurality of internal features.

10. The gas turbine engine component as recited in claim 9, wherein said plurality of internal features includes pedestals.

11. The gas turbine engine component as recited in claim 1, wherein said platform has a pressure side and a suction side relative to said airfoil portion, and said plurality of first surface features and said plurality of second surface features extend along said pressure side.

12. The gas turbine engine component as recited in claim 1, wherein said airfoil section has a leading edge and a trailing edge, said cooling passage includes an intermediate portion spaced between a first portion and a second portion, said first portion extending axially between an inlet and said leading edge, said second portion extending axially between an outlet and said trailing edge, and said plurality of first surface features and said plurality of second surface features being located in said intermediate portion.

13. The gas turbine engine component as recited in claim 12, wherein at least one of said plurality of first surface features and said plurality of second surfaces feature is located in at least one of said first portion and said second portion.

14. The gas turbine engine component as recited in claim 1, wherein said plurality of first surface features and said plurality of second surface features are located within said platform.

15. The gas turbine engine component as recited in claim 1, wherein said plurality of first surface features and said plurality of second surface features are located in said airfoil section.

16. The gas turbine engine component as recited in claim 1, wherein at least one of said plurality of first surface features and said plurality of second surface features include two surface features each having a triangular geometry.

17. The gas turbine engine component as recited in claim 3, wherein said plurality of third surface features are spaced apart from said plurality of first surface features and said plurality of second surface features.

18. The gas turbine engine component as recited in claim 15, wherein:
    said airfoil section has a leading edge and a trailing edge; and
    said cooling passage, said plurality of first surface features and said plurality of second surface features are located adjacent to the leading edge.

* * * * *